US006782513B1

(12) United States Patent
Janik

(10) Patent No.: US 6,782,513 B1
(45) Date of Patent: Aug. 24, 2004

(54) HIGH POWER FACTOR INTEGRATED CONTROLLED FERRORESONANT CONSTANT CURRENT SOURCE

(75) Inventor: Raymond G. Janik, Bloomingdale, IL (US)

(73) Assignee: Shape Electronics, Inc., Addison, IL (US)

(*) Notice: Subject to any disclaimer, the term of this patent is extended or adjusted under 35 U.S.C. 154(b) by 0 days.

(21) Appl. No.: 10/076,983

(22) Filed: Feb. 15, 2002

(51) Int. Cl.$^7$ .......................... G06F 17/50; G05F 1/13; H02M 5/42

(52) U.S. Cl. ................. 716/2; 716/9; 716/10; 323/248; 363/75; 363/82; 363/93

(58) Field of Search ............................. 716/8, 2, 9, 10; 323/248; 363/75, 82, 90, 93

(56) References Cited

U.S. PATENT DOCUMENTS

| | | | | |
|---|---|---|---|---|
| 3,500,128 A | | 3/1970 | Liepens ..................... | 315/278 |
| 3,573,606 A | | 4/1971 | Hart .......................... | 323/248 |
| 3,612,988 A | * | 10/1971 | Wanlass .................... | 323/248 |
| 4,042,871 A | * | 8/1977 | Grubbs et al. ............. | 363/28 |
| 4,142,141 A | * | 2/1979 | Hase ......................... | 323/248 |
| 4,156,175 A | | 5/1979 | Nissan ....................... | 323/248 |
| 4,242,630 A | * | 12/1980 | Szpakowski et al. ...... | 323/248 |
| 4,286,193 A | * | 8/1981 | King et al. ................ | 315/175 |
| 4,321,652 A | * | 3/1982 | Baker et al. ............... | 361/209 |
| 4,439,722 A | * | 3/1984 | Budnik ...................... | 323/248 |
| 4,465,966 A | * | 8/1984 | Long et al. ................ | 323/348 |
| 4,800,356 A | * | 1/1989 | Ellis .......................... | 336/184 |
| 5,451,857 A | * | 9/1995 | Moe .......................... | 320/150 |
| 5,571,439 A | * | 11/1996 | Daley et al. ............... | 219/716 |
| 5,886,507 A | | 3/1999 | Janik ......................... | 336/184 |
| 5,939,838 A | | 8/1999 | Janik ......................... | 315/291 |
| 6,313,635 B1 | * | 11/2001 | Noll .......................... | 324/395 |
| 6,348,782 B1 | * | 2/2002 | Oughton et al. .......... | 323/284 |
| 6,426,610 B1 | * | 7/2002 | Janik ......................... | 323/248 |

FOREIGN PATENT DOCUMENTS

| | | | |
|---|---|---|---|
| DE | 19540854 A1 * | 5/1997 | ............ G08C/17/04 |
| GB | 1 255 239 | 12/1971 | .............. G05F/3/06 |

OTHER PUBLICATIONS

Willis, Donald Henery, Belgium Patent Publication No. BE–892883–A, published Aug. 16, 1982, abstract only.*
Kadyrov et al., Patent Publication No. SU–754396–B, published Aug. 10, 1980, abstract only.*
Alimov et al., Patent Publicaiton No. SU–826322–B, published May 5, 1981, abstract only.*
Katashin, Patent Publication No. SU–855645–B, published Aug. 15, 1981, abstract only.*
NN7606294, "Controlled Ferroresonant Power Supply Circuit With Linear Gain", IBM Technical Disclosure Bulletin, vol. 19, No 1, Jun. 1976, pp. 294–295 (3 pages).*
Bashkirov et al., "Current–limiting reactor based on high–Tc superconductors", IEEE Transactions on Magnetics, vol. 27, No. 2, Mar. 1991, pp. 1089–1092.*

* cited by examiner

*Primary Examiner*—Matthew Smith
*Assistant Examiner*—Phallaka Kik
(74) *Attorney, Agent, or Firm*—McCormick, Paulding & Huber LLP

(57) ABSTRACT

A method of designing a high power factor integrated ferroresonant constant current source includes the steps of providing an input coil disposed about a ferromagnetic core and to be coupled to an AC voltage source. An output coil is to be coupled to a load. A control coil is coupled to a switch for regulating current output of the constant current source. A first capacitor coil is inductively coupled to the output coil and coupled to a capacitor to provide a first resonant sub-circuit having maximum gain, and a second capacitor coil is inductively coupled to the control coil and coupled to a capacitor to provide a second resonant sub-circuit to control resonant gain. A flux density ($B_{PRI}$) is selected for a portion of the core around the input coils that is substantially lower than the flux density $B_{CAP}$ of a portion of the core around the capacitor coils.

13 Claims, 9 Drawing Sheets

HIGH POWER FACTOR INTEGRATED CONTROLLED FERRORESONANT CONSTANT CURRENT SOURCE

CROSS REFERENCE TO RELATED APPLICATION

Some related material is disclosed and claimed in my U.S. patent application Ser. No. 09/904,997, filed Jul. 13, 2001, now U.S. Pat. No. 6,426,610, the disclosure of which is herein incorporated by reference.

FIELD OF THE INVENTION

The present invention relates generally to ferroresonant transformers, and more particularly to a method of designing a high power factor ferroresonant constant current source.

BACKGROUND OF THE INVENTION

The industry's choice of root-mean-square (rms) to measure AC voltage and current introduced the power factor concept. Power factor accounts for the discrepancy between kilovolt-ampere (kva) and kilowatt (kw), where kva is the multiplicative product of the rms current and voltage, and kw is the real power.

$$I_{RMS} = \sqrt{\frac{1}{T}\int_0^T i^2(t)\,dt} \quad (1)$$

$$V_{RMS} = \sqrt{\frac{1}{T}\int_0^T v^2(t)\,dt} \quad (2)$$

$$P_{Watts} = \frac{1}{T}\int_0^T i(t)\cdot v(t)\,dt \quad (3)$$

$$PF = \frac{P_{Watts}}{I_{RMS} V_{RMS}} \quad (4)$$

where i(t) and v(t) are the instantaneous current and voltage, respectively, and T is the period. The power factor can be from 0, for pure inductive or capacitive loads, to 1.0 for resistive loads—the higher the better. As can be seen from the above expressions, $I_{RMS}\cdot V_{RMS}=P_{watts}$ only if the load is resistive. For non-linear loads, or inductive/capacitive loads, the real power $P_{watts}$ is less than $I_{RMS}\cdot V_{RMS}$. It is important that an electrical load maintains a high power factor so as to reduce the current going to the load as well as the cost of cable and $I^2R$ losses.

Power factor has mostly been associated with inductive loads in which AC capacitors are incorporated to cancel the inductive current and correct any lagging power factor. The power factor in this case can be represented in terms of the cosine of the phase angle $\alpha$ between the voltage and the current: $PF=\cos(\alpha)$. The above power factor is also known as displacement power factor. There is another form of power factor that is associated with non-linear loads such as, for example, rectified capacitive loads, and is referred to as distortion power factor.

Ferroresonant transformers typically have an input power factor of 0.98 to 1.0, and are used to buffer both displacement and distortion power factor loads. A controlled ferroresonant constant current source varies the output current by controlling the conduction angle of an inductive reactance $X_L$ that is magnetically coupled to the resonant capacitor. The inductive discontinuous current introduces both displacement and distortion power factor. The distortion power factor can be reduced to virtually zero by increasing the capacitor leakage reactance $X_S$. As a result, displacement power factor is the only form of power factor present in a ferroresonant transformer, which is contributed by the control inductive reactance $X_L$.

A constant voltage ferroresonant transformer has a high input power factor since the inductive current contributed by the control inductive reactance $X_L$ is kept to a minimum. A controlled ferroresonant constant current source, on the other hand, requires the voltage to change over a wider range in order to maintain a constant load current. The effect of this inductive current, contributed by $X_L$, reflected on the primary may reduce the input power factor to less than 0.2 during minimum output current sensing.

As shown in FIG. 1 and as explained more fully in my U.S. patent application Ser. No. 09/904,997, now U.S. Pat. No. 6,426,610, a simplified equivalent circuit 10 of a controlled ferroresonant constant current source shows the control inductive reactance $X_L$ external to the core of the ferroresonant transformer. This equivalent circuit is useful in deriving the expression for power factor as set forth below in equation 5. As shown in FIG. 2 and as also explained more fully in my U.S. patent application Ser. No. 09/904,997, now U.S. Pat. No. 6,426,610, another equivalent circuit 100 of a controlled ferroresonant constant current source shows the control inductive reactance $X_L$ integrated into the core of the ferroresonant transformer. This equivalent circuit is useful for deriving the expressions for the resonant capacitor gain A to be explained hereinbelow with respect to equations 6 through 14. The equivalent circuits of FIGS. 1 and 2 will briefly be explained prior to using them for deriving equations.

With reference to FIG. 1, the circuit 10 may be made to function as a constant current source by incorporating an output inductor, such as an output coil 12 and shunt 14 into the core of the ferroresonant transformer. In this instance, a control inductor 16 is employed externally of the transformer core.

As mentioned in my U.S. patent application Ser. No. 09/904,997, now U.S. Pat. No. 6,426,610, several factors were considered in developing an improved controlled ferroresonant constant current source. A linear inductor includes a steel core, a coil and an air gap. The inductance is determined by the core cross-sectional area, the number of turns, and the length of the air gap. As the power rating of a controlled ferroresonant current source increases, the resonant capacitance, capacitive current, and control inductive current increase, which requires the control inductor to have a lower value. To reduce the inductance of an inductor, the turns need to be reduced or the air gap increased. The cross-sectional area needs to be adjusted to maintain an acceptable maximum flux density. A large air gap poses serious thermal problems because of fringing flux, which cuts through the core laminations and the magnet wire at a high loss angle, producing eddy currents that overheat the inductor and reduce efficiency. Increasing the size of the magnet wire will further increase the magnitude of eddy currents and reduce efficiency.

Integrating the control inductor into the core of the ferroresonant transformer using magnetic shunts significantly reduces the gap loss heating effect. The air gap of the shunts is more effective in determining inductance and can be easily distributed into multiple air gaps of shorter lengths. If the control inductor is integrated with the transformer core, and the output inductor is external to the transformer core, then the inductor is subjected to the load voltage which may be extremely high in magnitude (i.e., 1000–5000V). A high voltage inductor requires a large number of turns with high electrical insulation between turns and layers. A large number of turns will also increase the resistive losses and reduce the efficiency.

It has been discovered that the controlled ferroresonant constant current source may be improved by integrating both the output inductor and the control inductor onto the core of the ferroresonant transformer while using standard EI laminations. In order for the controlled ferroresonant constant current source to operate, the control inductor must interface with the capacitor sub-circuit such that the currents are in phase.

With reference to the circuit 100 of FIG. 2 and as explained more fully in my U.S. patent application Ser. No. 09/904,997, now U.S. Pat. No. 6,426,610, it has been determined that drawbacks in integrating the output inductor and the control inductor are solved by creating two separate resonant sub-circuits—one to interface with the load inductor including the output coil 102 and the shunt 104 to provide maximum gain, and another to interface with the control inductor, including the control coil 106 and the shunt 108 to control the resonant gain.

The benefits of incorporating both the control inductor and the output inductor onto the transformer core are 1) complete isolation between all circuits; 2) simplified wiring between the transformer core and external components; 3) low inductance, high current chokes no longer a limiting factor to increasing the power rating of the current source since shunts have a wider inductance range; and 4) permits the use of standard laminations which simplifies the assembly process.

Returning now to our discussion on power factor, since the distortion power factor can be greatly reduced by the proper choice of $X_S$, the input power factor is predominantly the result of displacement power factor, $PF=\cos(\alpha)$, which may be derived from the circuit 10 of FIG. 1 and expressed in equation (5) as:

$$PF = \frac{1}{\sqrt{1 + \left(\frac{X_S(X_C X_L - X_L X_O + X_C X_O)^2 + X_L X_C X_O (X_C X_L - X_L X_O + X_C X_O) + R^2(X_C - X_L)(X_C X_L - X_S X_L + X_S X_C)}{R_S[(X_C X_L - X_L X_O + X_C X_O)^2 + R^2(X_C - X_L)^2] + X_C^2 X_L^2 R}\right)^2}}$$

Even though $X_L$ is switched in and out of the circuit in a piecewise continuous fashion (see waveform of $I_L$ shown in FIG. 6), it is assumed to be continuously variable because of the filtering effect of $X_S$, $X_O$ and $X_C$.

FIGS. 7, 8, 9, 10 and 11 are plots of power factor versus changes in $X_C$, $X_S$, $X_L$, $X_O$ and R. More specifically, FIG. 7 is a graph of curve 500 illustrating power factor over a limited range of values of the control inductive reactance $X_L$. FIG. 8 is a graph of curve 600 illustrating the power factor over an extended range of values of the control inductive reactance $X_L$. FIG. 9 is a three-dimensional graph of contour 700 illustrating power factor as a function of $X_S$ and $X_L$. FIG. 10 is a three-dimensional graph of contour 800 illustrating power factor as a function of $X_O$ and $X_L$. FIG. 11 is a three-dimensional graph of contour 900 illustrating power factor as a function of $X_C$ and $X_L$.

These plots show that there exists an optimum set of values for $X_S$, $X_C$ and $X_O$ that will result in the highest power factor. These values, normalized to R=1, are 0.7, 0.55 and 0.7, respectively. $R_S$ accounts for the resistance of all the windings and is assumed to be 0.01. In order to improve the power factor, $X_L$ must remain higher than 0.8, as shown in FIG. 7. Some applications require the minimum output current to be so low that $X_L$ would assume such a low value that the resulting input power factor would be less than 0.2 lagging. A commonly implemented solution for this lagging power factor is to introduce a power factor correction circuit on the primary, which comprises a capacitor or a combination of a capacitor and an inductor. While this may improve the power factor, it could cause the system to oscillate, particularly during a step load change or a step input voltage change, as well as distortion of the input current, and a reduction in the efficiency.

It is a general object of the present invention to overcome the difficulties and disadvantages associated with improving the input power factor of a ferroresonant constant current source.

SUMMARY OF THE INVENTION

The present invention is directed to a method of designing a high power factor integrated ferroresonant constant current source. The method includes the steps of providing an input coil disposed about a ferromagnetic core and to be coupled to an AC voltage source. An output coil is disposed about the core and to be coupled to a load. A control coil is disposed about the core and coupled to a switch for regulating current output of the constant current source. A first capacitor coil is disposed about the core and inductively coupled to the output coil and coupled to a capacitor to provide a first resonant sub-circuit having maximum gain, and a second capacitor coil disposed about the core and inductively coupled to the control coil and coupled to a capacitor to provide a second resonant sub-circuit to control resonant gain. A flux density ($B_{PRI}$) is selected for a portion of the core around the input coils that is substantially lower than the flux density $B_{CAP}$ of a portion of the core around the capacitor coils.

Preferably, the flux density $B_{PRI}$ is about one half the flux density $B_{CAP}$. Further, $B_{CAP}$ is preferably about 14 kG to about 15 kG. It is also preferable to provide a leakage reactance $X_S$ satisfying the mathematical expression $$X_S \leq \frac{R^2 + X_O^2}{RA},$$

where R is the resistance of all of the windings, $X_O$ is the reactance of the output inductor magnetically coupled to the resonant capacitor, and A is the capacitor voltage gain, as described hereinbelow with respect to equation (6).

DETAILED DESCRIPTION OF THE PREFERRED EMBODIMENTS

A conventional way of designing ferroresonant transformers is to have the flux density $B_{CAP}$ of the capacitor portion of the core be slightly less than the maximum allowable flux density—typically about 17 kilogauss (kG). If $B_{CAP}$ is lower, the design requires more copper and steel—making it expensive—as well as increasing the open circuit voltage during uncontrolled operation.

The primary or input flux density $B_{PRI}$ is designed to be slightly less than $B_{CAP}$. The smaller $B_{PRI}$ is with respect to $B_{CAP}$, the more required gain, which makes the design more expensive.

Figure 2:
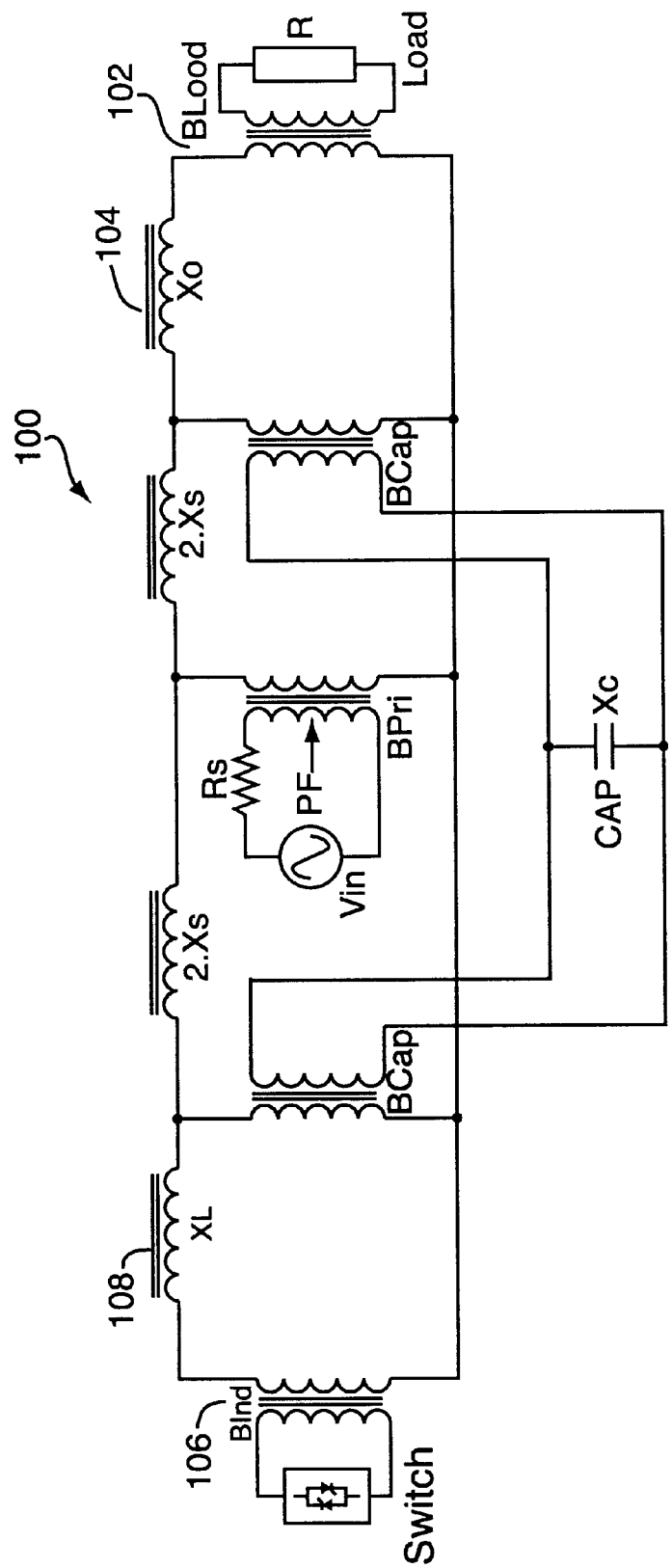
FIG. 2 is a simplified equivalent electrical circuit of a controlled ferroresonant constant current source where the control inductive reactance $X_L$ is integrated into the core of the ferroresonant transformer.

The choice of capacitor is decided by the gain equation (6) set forth below. It is based on the circuit running at full load, low input voltage with the control inductor turned completely off to maximize gain (see FIG. 2). The control inductor is designed based on the need to reduce the voltage during no load, high input voltage. If the ferroresonant transformer is a constant current type, the control inductor requires a very low inductance since it would be necessary to change the capacitor voltage by a factor of 2.5, which will cause the input power factor to drop to less than 0.2 lagging.

In order to keep the power factor high, while bringing the output current to a minimum, a different design approach is presented. The input flux density $B_{PRI}$ is chosen to be much lower than $B_{CAP}$—around one half its value. The reduction of the primary flux density relative to secondary $B_{CAP}$ will cause the gain to drop, which is normally not acceptable, except that, in this case, the control inductive reactance $X_L$ does not have to be as low.

To increase gain during high current setting, the capacitor value will have to be increased. But if that were to happen, there will have to be a proportional reduction in the control inductance (to bring the current back to minimum) which would result in low input power factor so as to bring the situation back to where it was started.

An alternate way to increase the capacitive reactance is to increase the capacitor voltage. If the secondary flux density $B_{CAP}$ is chosen to be lower in value (14–15 kG) than that in traditional designs, it will allow the capacitor voltage to swing over a wider range as the output current is varied from maximum to minimum. This change in capacitor voltage will aid the inductor in controlling the output as will now be explained.

Figure 3:
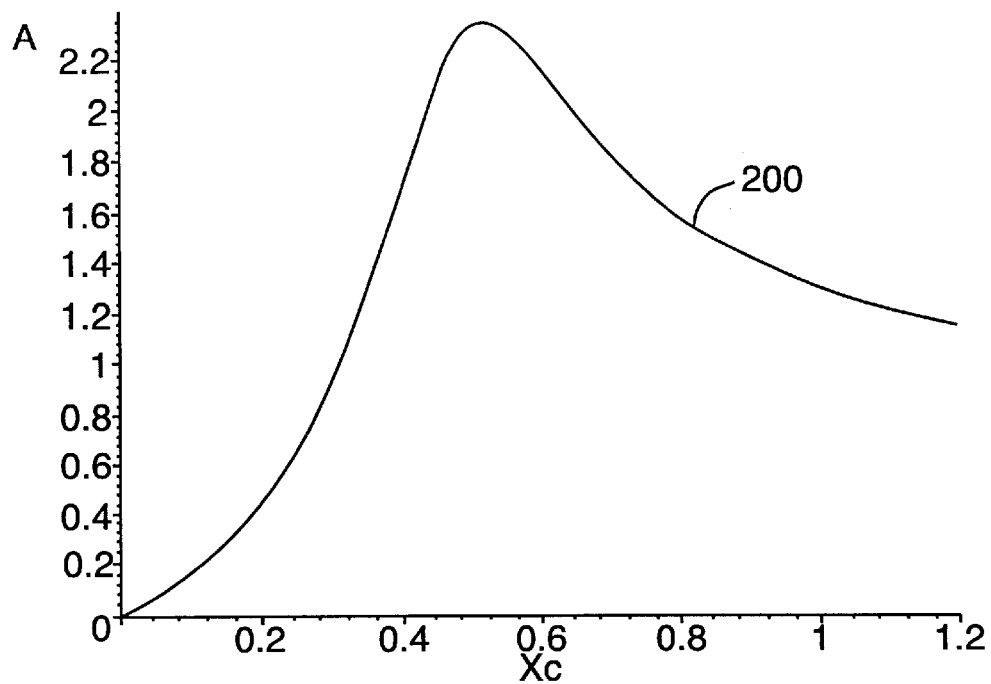
FIG. 3 is a graph illustrating the resonant capacitor gain A as a function of the capacitive reactance $X_C$ of an integrated controlled ferroresonant constant current source.
Figure 6:
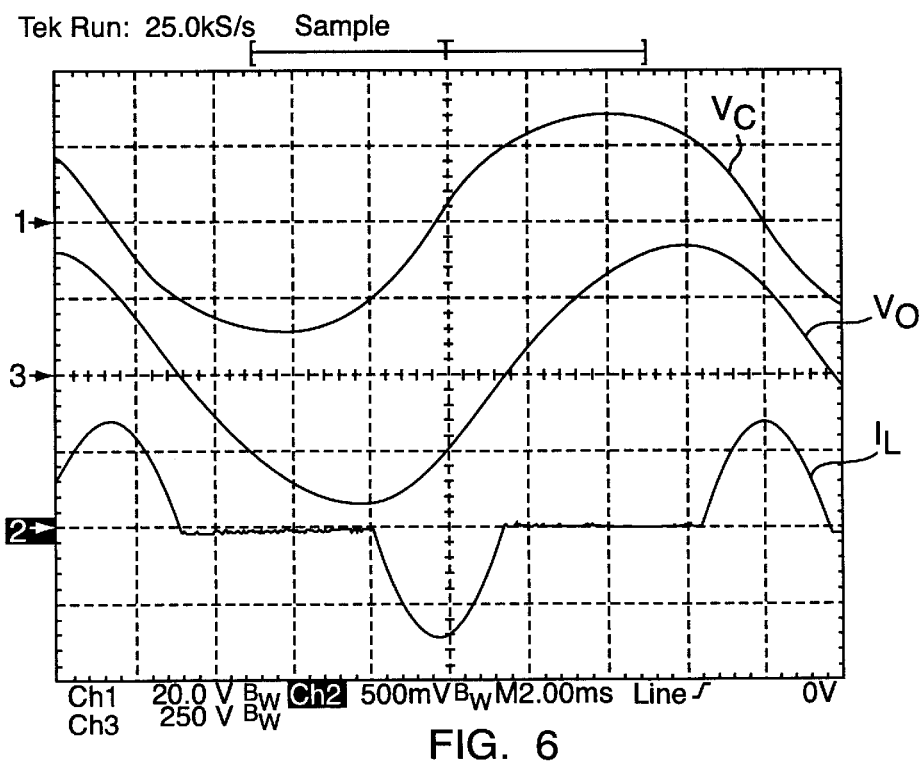
FIG. 6 is a graph illustrating the capacitor voltage $V_C$, the load voltage $V_O$ and the control inductor current $I_L$ of the controlled ferroresonant constant current source equivalent circuit of FIG. 1.

As the inductor duty cycle (see waveform $I_L$ in FIG. 6) is increased, the net capacitive reactance $X_C$ will be increased and the resonant gain A will drop (see curve 200 of FIG. 3 showing gain A as a function of $X_C$). The operative range of the curve 200 is that portion to the left of the peak, which corresponds to $X_C > 0.5$. The reduction in gain will also reduce the capacitor voltage, which will reduce the amount of energy stored in the capacitor, $E=1/2CV^2$, further reducing gain in a regenerative mode. Conversely, when the inductor duty cycle is reduced, the net capacitance is increased (i.e., capacitive reactance $X_C$ is reduced), which will increase the resonant gain, as well as the capacitance voltage, and increase the energy storage in the capacitor, providing more resonant gain (see Table 1).

TABLE 1

| $I_{INPUT}$ THD | PF | $V_{CAP}$ | $I_O$ | $P_{OUT}$ (KW) | $I_O$THD | Eff |
|---|---|---|---|---|---|---|
| 1.9 | 0.98 | 199% | 100% | 100% | 1.3 | 94% |
| 4.8 | 0.96 | 157% | 79% | 63% | 1.5 | 93% |
| 7.1 | 0.99 | 123% | 62% | 39% | 1.9 | 93% |
| 8.0 | 0.99 | 103% | 52% | 27% | 2.0 | 91% |
| 6.0 | 0.80 | 85% | 42% | 18% | 1.7 | 90% |

In the case of a controlled ferroresonant constant current source, the proper choice of $X_S$, $X_O$, $B_{CAP}$, $B_{PRI}$ and $R_{LOAD}$ will allow the capacitor voltage to rise in response to high demand in output current. The choice of $X_S$ and $X_C$ for a given $R_S$ is critical in ensuring that there is enough energy at full load to start the regenerative cycle, otherwise the system will remain at low power level.

Capacitor voltage gain A (as shown in FIG. 3 as a function of $X_C$) may be represented by the following expression:

$$A = \sqrt{\frac{X_C^2(R^2 + X_O^2)}{X_S(X_C - X_O)(X_S X_C + 2X_C X_O - X_S X_O) + X_C^2(R^2 + X_O^2) + X_S R^2(X_S - 2X_C)}} \quad (6)$$

where $R_S$ is assumed to be negligible, and $X_L \to \infty$, so as to maximize gain.

Solving for $X_C$ yields:

$$X_C = AX_S \frac{A(X_O X_S + R^2 + X_O^2) + \sqrt{(R^2 + X_O^2)^2 - (RAX_S)^2}}{A^2(X_S + X_O)^2 - (R^2 + X_O^2)^2 + A^2 R^2} \quad (7)$$

Since $X_C$ is a real quantity, the term $\sqrt{(R^2+X_O^2)^2-(RAX_S)^2}$ must be real, and therefore, $$(RAX_S)^2 \leq (R^2 + X_O^2)^2 \Rightarrow X_S \leq \frac{R^2 + X_O^2}{RA} \quad (8)$$

FIG. 3 is a graph of curve 200 illustrating the behavior of the resonant capacitor gain A as a function of the capacitive reactance $X_C$, where $X_O$, $X_S$ and R are chosen so that they satisfy mathematical expression (8). The system is operated in the region between $X_C=0.6$, when $X_L$ is disconnected, and $X_{C \, net} \to \infty$, when $X_C$ and $X_L$ are in parallel resonance ($X_C=X_L$). When $X_L<X_C$, the parallel combination of $X_C$ and $X_L$ becomes inductive, and the input power factor starts dropping.

Figure 4:
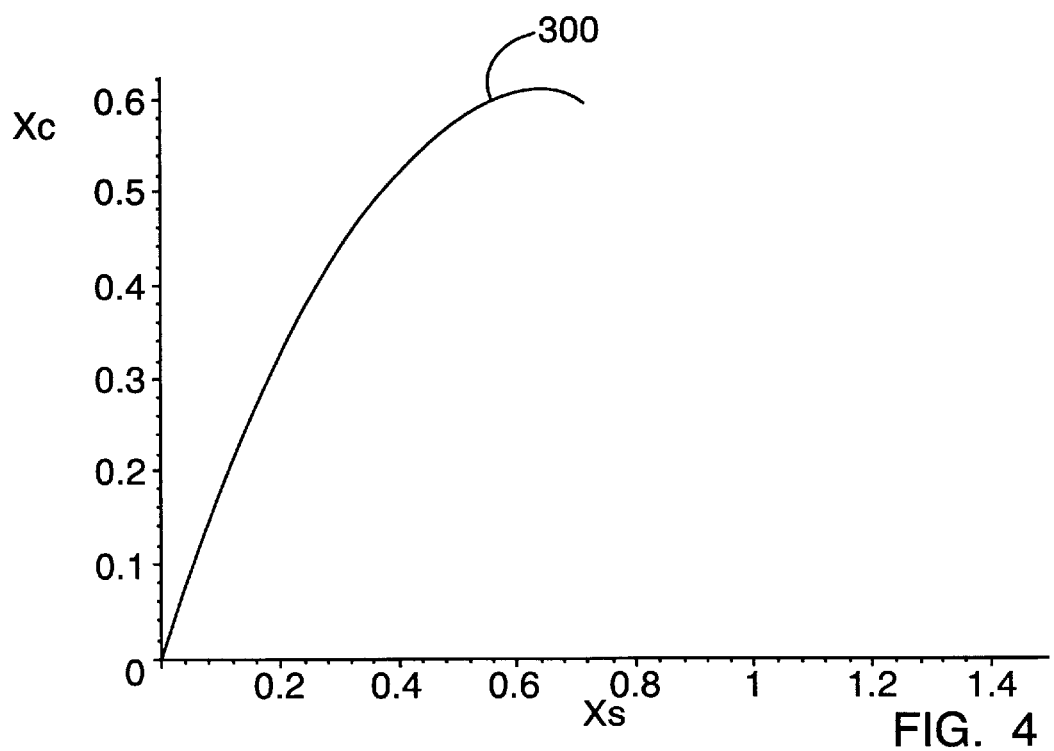
FIG. 4 is a graph illustrating the range of real values of $X_C$ as $X_S$ varies for a predetermined gain A.
Figure 5:
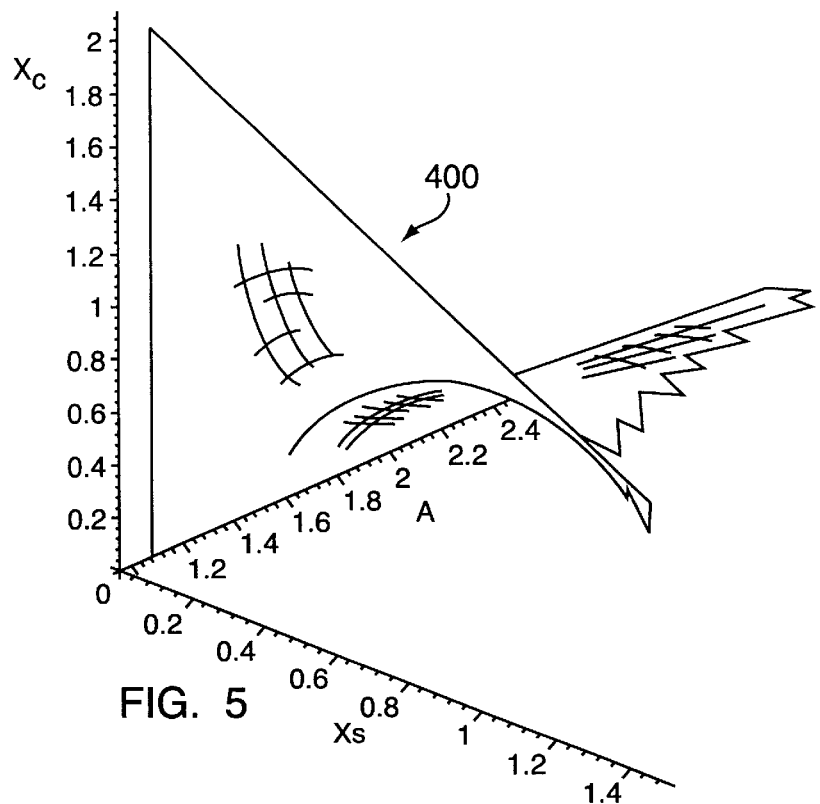
FIG. 5 is a three-dimensional graph illustrating the range of values of $X_C$ as $X_S$ and gain A vary.
Figure 7:
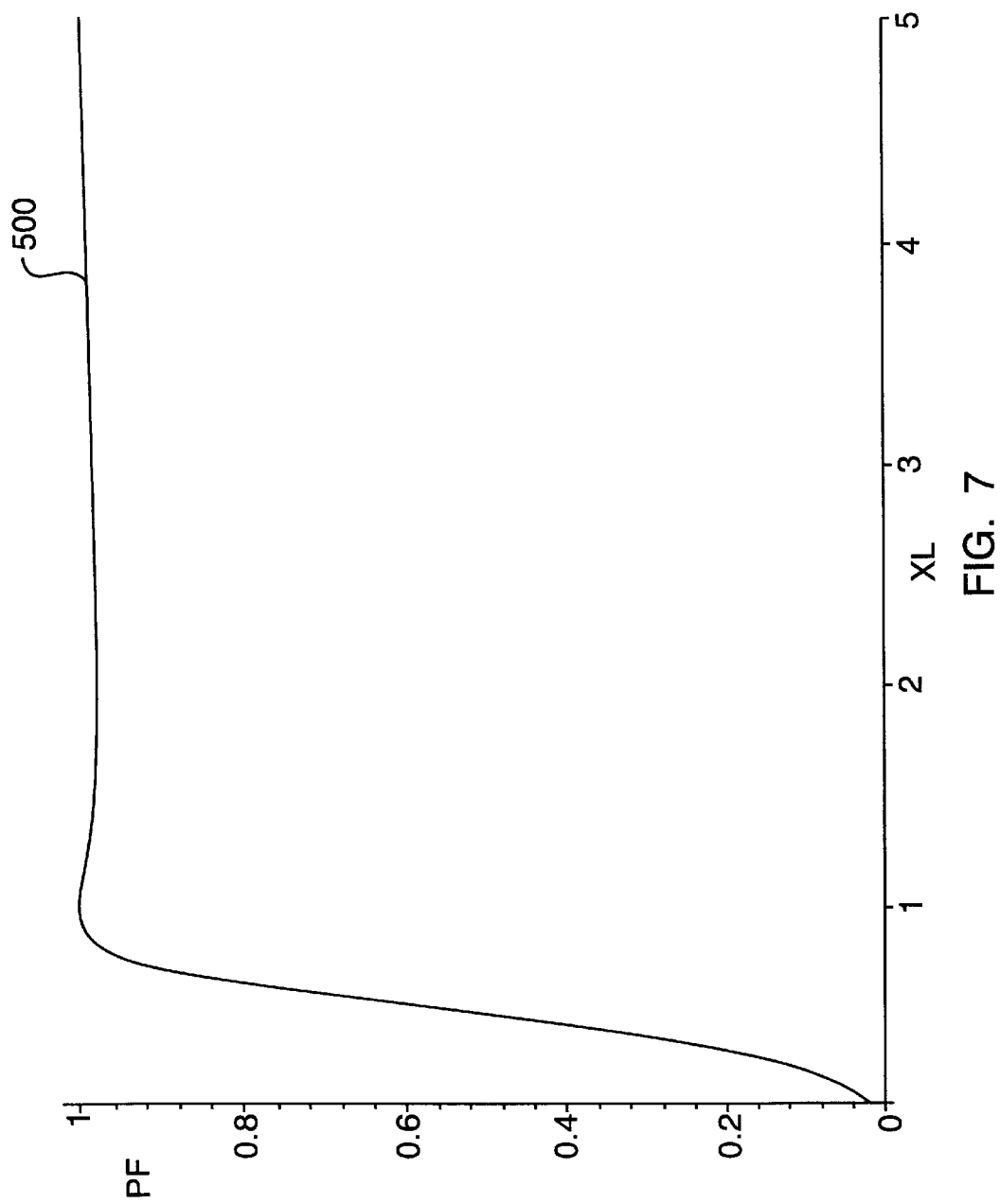
FIG. 7 is a graph illustrating power factor over a limited range of values of the control inductive reactance $X_L$.
Figure 8:
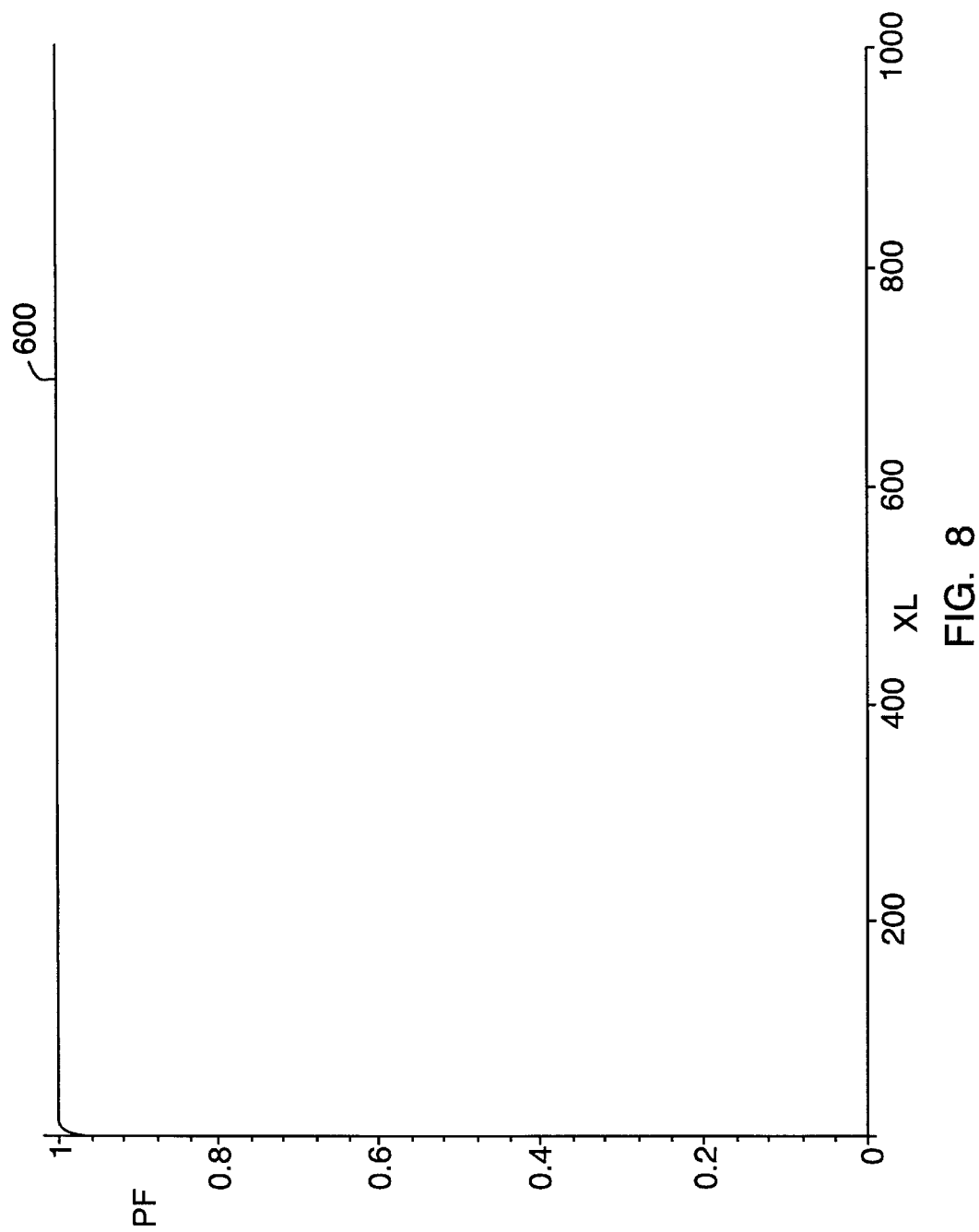
FIG. 8 is a graph illustrating the power factor over an extended range of values of the control inductive reactance $X_L$.
Figure 9:
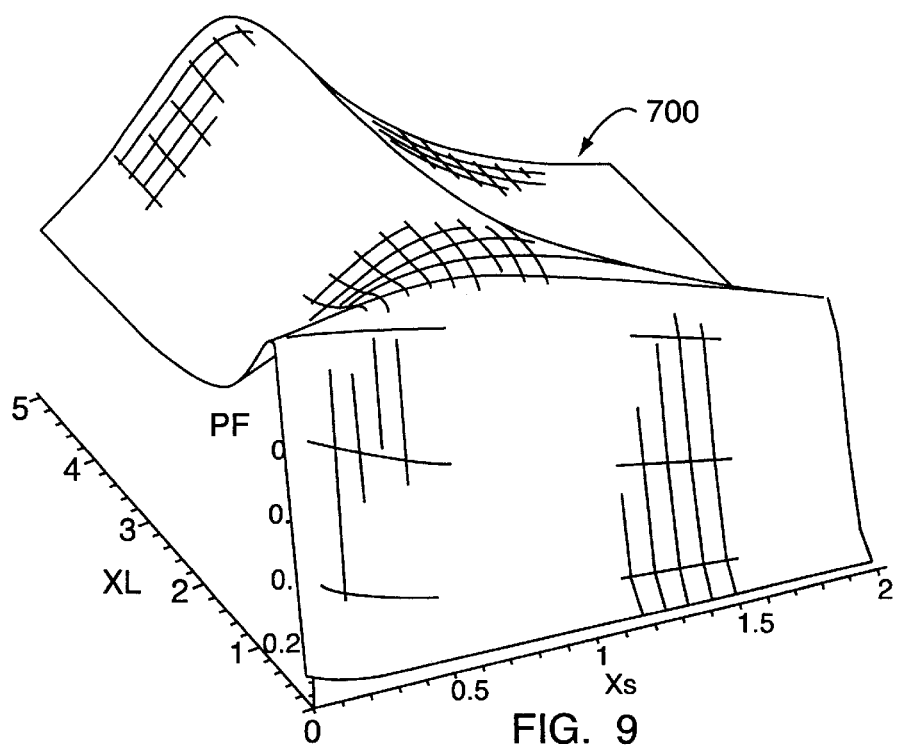
FIG. 9 is a three-dimensional graph illustrating power factor as a function of $X_S$ and $X_L$.
Figure 10:
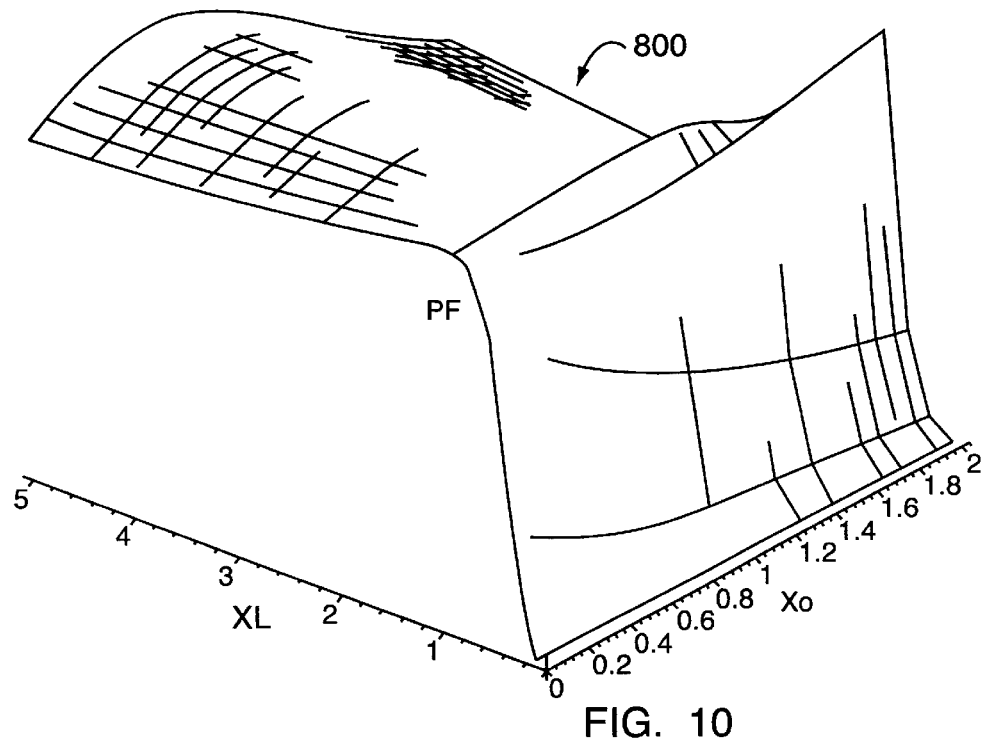
FIG. 10 is a three-dimensional graph illustrating power factor as a function of $X_O$ and $X_L$.
Figure 11:
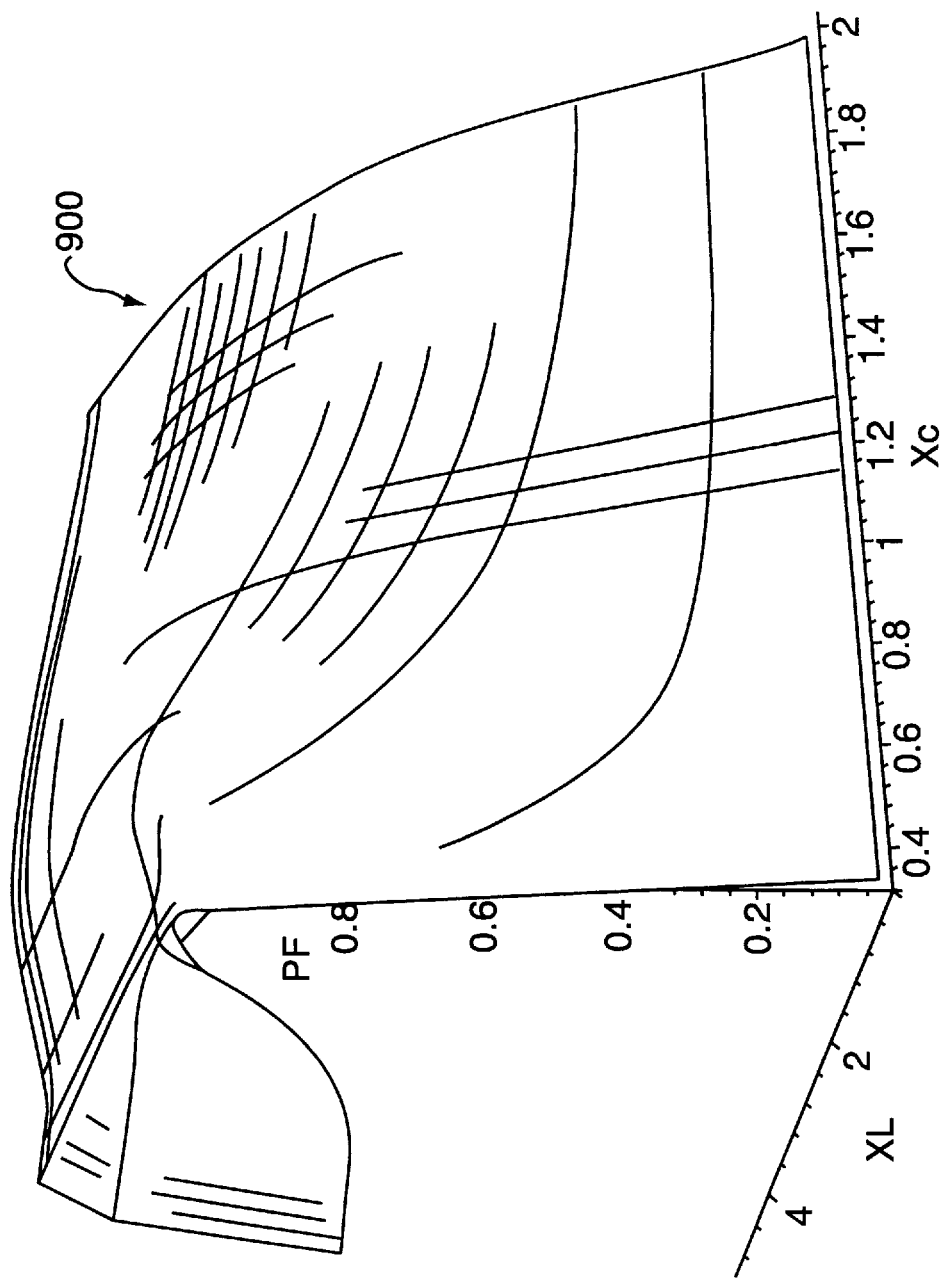
FIG. 11 is a three-dimensional graph illustrating power factor as a function of $X_C$ and $X_L$.

FIGS. 4 and 5 illustrate the range of real values of $X_C$ as $X_S$ and gain A change. More specifically, FIG. 4 is a two-dimensional graph of curve 300 illustrating the range of real values of $X_C$ as $X_S$ varies for a predetermined resonant capacitor gain A, and FIG. 5 is a three dimensional graph of contour 400 illustrating the range of values of $X_C$ as $X_S$ and resonant capacitor gain A vary. The discontinuity in the plots accounts for imaginary values of $X_C$. An interpretation of this mathematical condition is as follows: the leakage reactance $X_S$ must be reduced if the gain A increases. FIG. 7 which is a graph of curve 500 illustrating power factor over a limited range of values of the control inductive reactance $X_L$ shows that $X_L$ must have a normalized value between 0.5 and 1 in order for the power factor to be at maximum. Care must be taken in the choice of $X_S$ so that the condition in expression (8) is fulfilled, thereby ensuring a real value for $X_C$. If $X_S$ is allowed to increase beyond $$\frac{R^2 + X_O^2}{RA},$$

the system will start losing regulation, and no amount of real $X_C$ will improve gain, since the mathematical solution calls for a complex quantity for $X_C$.

The proper choice of $X_O$, and $B_{CAP}$ the portion of the core occupied by the capacitor circuit will saturate ($B_{CAP\ SAT}$) when the capacitor voltage reaches a certain value $V_{C\ MAX}$.

Figure 1:
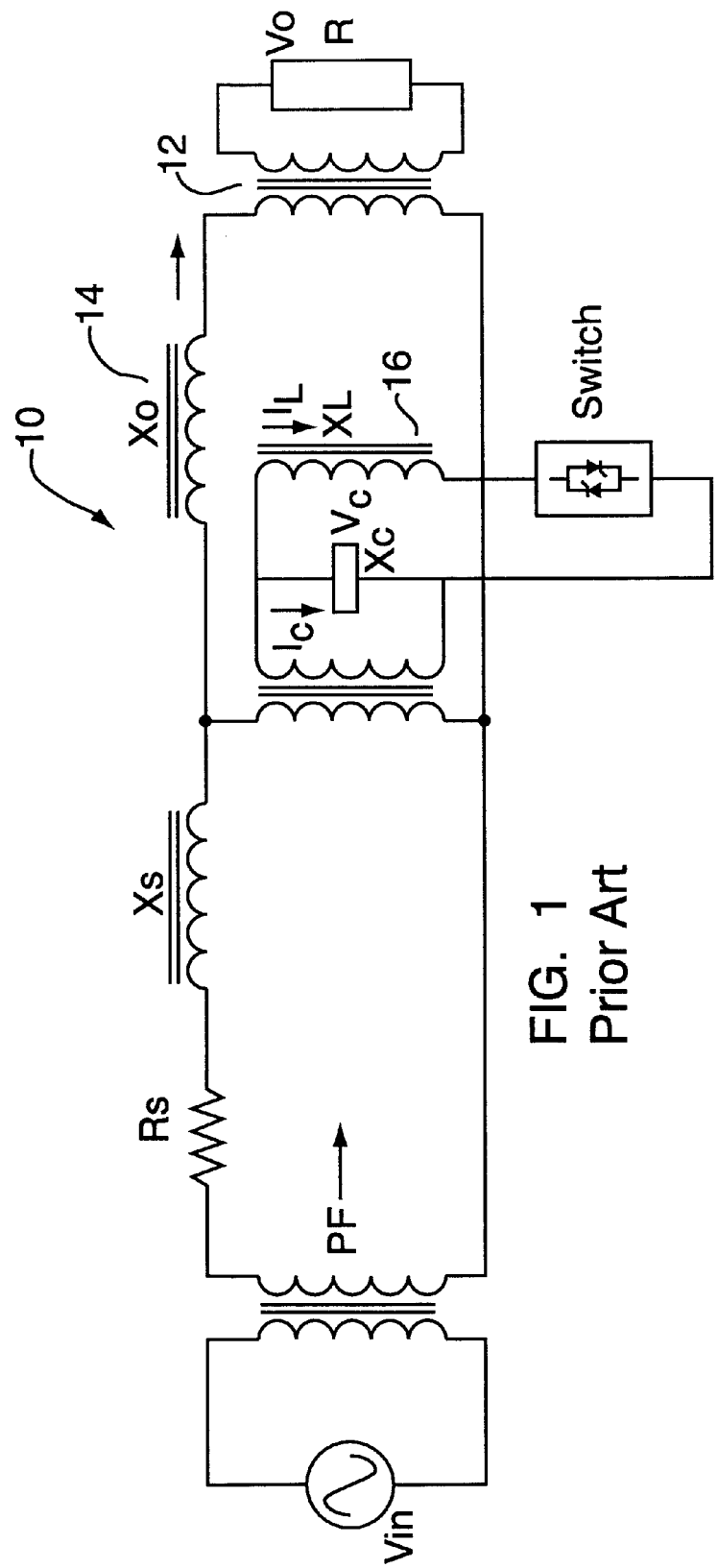
FIG. 1 is a simplified equivalent electrical circuit of a controlled ferroresonant constant current source.

Referring to the simplified equivalent electrical circuit of a controlled ferroresonant constant current source as shown in FIG. 1, $$I_{OMAX} = \frac{V_{CMAX}}{\sqrt{X_O^2 + R^2}} \tag{9}$$

and $$B_{CAP\ SAT} \propto V_{C\ MAX} \tag{10}$$

It follows that the maximum output current will be limited by the choice of the capacitor circuit saturating flux density $$I_{O\ MAX} \propto B_{CAP\ SAT} \tag{11}$$

Figure 12:
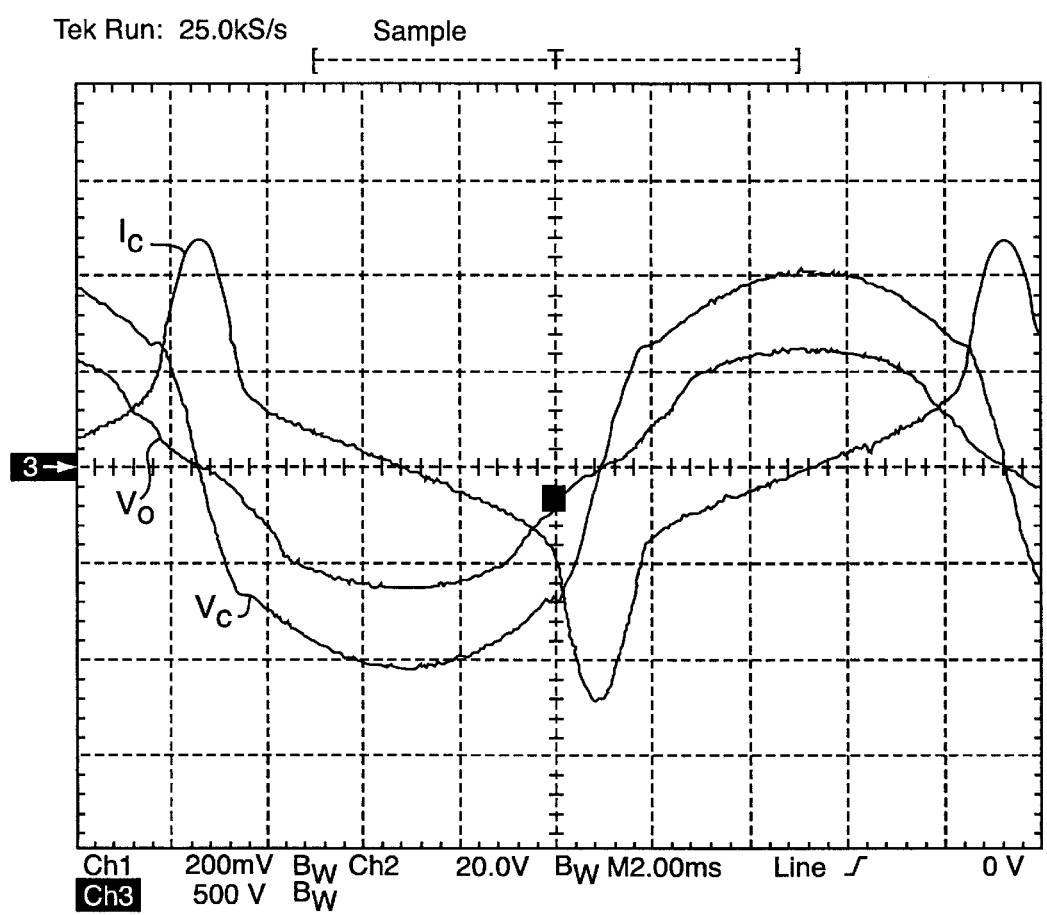
FIG. 12 is a graph illustrating the capacitor voltage $V_C$, the load voltage $V_O$ and the capacitor current $I_C$ during overload or during open circuit condition of the ferroresonant controlled constant current source of FIG. 1.

FIG. 12 shows the capacitor current waveform $I_C$, showing signs of core saturation, and the capacitor and lamp voltage waveforms $V_C$ and $V_O$, respectively.

Limiting the load current is very critical in certain applications, such as airport runway lighting, where an overcurrent may blow the incandescent lamps. A commonly used method to prevent overcurrents is to place an electronic current sensor and link to switches that would shut down the system. Having a built-in overcurrent limiting capability would save on cost and prevent the system from shutting down. Whether the solid state switch, in series with the control inductor, fails in open circuit mode or is erroneously forced to turn off, the core saturation will take over precisely at the maximum chosen output current.

Theoretically, current sources have an infinite open circuit voltage. Users require the open circuit voltage to be limited to a safe value to protect the insulation of the wiring from overvoltage breakdown. As explained above, the maximum lamp voltage is limited by the saturation flux density of the capacitor circuit. Referring again to the equivalent electrical circuit of a controlled ferroresonant constant current source shown in FIG. 1, the output open circuit voltage $$V_{O\ OC} = nV_{C\ MAX} \tag{12}$$

where n is the turns ratio of the lamp coil to the capacitor coil (assumed to be 1 in the analysis of gain and power factor, for simplicity). Since $$V_{CMAX} = \frac{B_{CAPSAT}}{B_{CAP}} V_C \tag{13},$$

it follows that $$V_{OOC} = n \frac{B_{CAPSAT}}{B_{CAP}} V_C \tag{14}.$$

In summary, with the proper choice of $X_C$, $X_S$, $X_L$, $X_O$, $B_{CAP}$, $B_{LAMP}$, $B_{IND}$ and $B_{PRI}$, the following results can be achieved:

1) High input power factor without the use of power factor correction circuit and input filters.
2) Maximize gain with minimum capacitors and high efficiency.
3) Reduce the control inductive current for lower input harmonics and total harmonic distortion (THD).
4) Provide a stable open circuit condition and limit the maximum current by causing part of the core to saturate.
5) Provide guidelines to avoid areas of imaginary values of the capacitive reactance and limit it to those that would produce real values for $X_C$.

While preferred embodiments have been shown and described, various modifications and substitutions may be made without departing from the spirit and scope of the invention. Accordingly, it is to be understood that the present invention has been described in a preferred embodiment by way of illustration and not by way of limitation.

What is claimed is:

1. A method of designing a high power factor integrated ferroresonant constant current source comprising the steps of:

providing an input coil disposed about a ferromagnetic core and to be coupled to an AC voltage source;

providing an output coil disposed about the core and to be coupled to a load;

providing a control coil disposed about the core and coupled to a switch for regulating current output of the constant current source;

providing a first capacitor coil disposed about the core and inductively coupled to the output coil and coupled to a capacitor to provide a first resonant sub-circuit having maximum gain, and a second capacitor coil disposed about the core and inductively coupled to the control coil and coupled to a capacitor to provide a second resonant sub-circuit to control resonant gain; and selecting a flux density ($B_{PRI}$) of a portion of the core around the input coil that is substantially lower than flux density $B_{CAP}$ of a portion of the core around the capacitor coils.

2. A method as defined in claim 1, wherein $B_{CAP}$ is about 14 kG to about 15 kG.

3. A method as defined in claim 1, further including the step of selecting a leakage reactance $X_S$ satisfying the following mathematical expression:

$$X_S \le \frac{R^2 + X_O^2}{RA},$$

where R is resistance of all of the windings, $X_O$ is reactance of an output inductor magnetically coupled to a resonant capacitor, and A is a capacitor voltage gain.

4. A method as defined in claim 1, further including the step of selecting the value of $X_O$ and $B_{CAP}$ to limit an output current $I_o$ to a predetermined maximum value $I_{O\,MAX}$ where $$I_{OMAX} = \frac{V_{CMAX}}{\sqrt{X_O^2 + R^2}}$$

and where $B_{CAP\,SAT} \propto V_{C\,MAX}$ wherein $X_O$ is reactance of an output inductor magnetically coupled to resonant capacitor, R is resistance of all windings, $B_{CAP\,SAT}$ is $B_{CAP}$ at saturation point and $V_{C\,MAX}$ is capacitor voltage $B_{CAP\,SAT}$.

5. A method as defined in claim 4, further including the step of selecting turns ratio (n) of the output coil to the capacitor coils to set an open circuit, output voltage $V_{O\,OC}$ to a predetermined value: where $$V_{OOC} = n\frac{B_{CAPSAT}}{B_{CAP}} V_C$$

wherein VC is capacitor voltage.

6. A method of designing a high power factor integrated ferroresonant constant current source comprising the steps of:

providing an input coil disposed about a ferromagnetic core and to be coupled to an AC voltage source;

providing an output coil disposed about the core and to be coupled to a load;

providing a control coil disposed about the core and coupled to a switch for regulating current output of the constant current source;

providing a first capacitor coil disposed about the core and inductively coupled to the output coil and coupled to a capacitor to provide a first resonant sub-circuit having maximum gain, and a second capacitor coil disposed about the core and inductively coupled to the control coil and coupled to a capacitor to provide a second resonant sub-circuit to control resonant gain; and selecting a flux density ($B_{PRI}$) of a portion of the core around the input coil that is about one half flux density $B_{CAP}$ of a portion of the core around the capacitor coils.

7. A method as defined in claim 6, wherein $B_{CAP}$ is about 14 kG to about 15 kG.

8. A method as defined in claim 6, further including the step of selecting the value of $X_O$ and $B_{CAP}$ to limit an output current $I_o$ to a predetermined maximum value $I_{O\,MAX}$ where $$I_{OMAX} = \frac{V_{CMAX}}{\sqrt{X_O^2 + R^2}}$$

and where $B_{CAP\,SAT} \propto V_{C\,MAX}$ wherein $X_O$ is reactance of an output inductor magnetically coupled to resonant capacitor, R is resistance of all windings, $B_{CAP\,SAT}$ is $B_{CAP}$ at saturation point and $V_{C\,MAX}$ is capacitor voltage $B_{CAP\,SAT}$.

9. A method as defined in claim 8, further including the step of selecting turns ratio (n) of the output coil to the capacitor coils to set an open circuit, output voltage $V_{O\,OC}$ to a predetermined value: where $$V_{OOC} = n\frac{B_{CAPSAT}}{B_{CAP}} V_C$$

wherein $V_C$ is capacitor voltage.

10. A method of designing a high power factor integrated ferroresonant constant current source comprising the steps of:

providing an input coil disposed about a ferromagnetic core and to be coupled to an AC voltage source;

providing an output coil disposed about the core and to be coupled to a load;

providing a control coil disposed about the core and coupled to a switch for regulating current output of the constant current source;

providing a first capacitor coil disposed about the core and inductively coupled to the output coil and coupled to a capacitor to provide a first resonant sub-circuit having maximum gain, and a second capacitor coil disposed about the core and inductively coupled to the control coil and coupled to a capacitor to provide a second resonant sub-circuit to control resonant gain;

selecting a flux density ($B_{PRI}$) of a portion of the core around the input coil that is about one half flux density $B_{CAP}$ of a portion of the core around the capacitor coils; and selecting a leakage reactance $X_S$ satisfying the following mathematical expression:

$$X_S \leq \frac{R^2 + X_O^2}{RA},$$

where R is resistance of all of the windings, $X_O$ is reactance of an output inductor magnetically coupled to a resonant capacitor, and A is a capacitor voltage gain.

11. A method as defined in claim 10, wherein $B_{CAP}$ is about 14 kG to about 15 kG.

12. A method as defined in claim 10, further including the step of selecting the value of $X_O$ and $B_{CAP}$ to limit an output current $I_o$ to a predetermined maximum value $I_{O\,MAX}$ where $$I_{OMAX} = \frac{V_{CMAX}}{\sqrt{X_O^2 + R^2}}$$

and where $B_{CAP\,SAT} \propto V_{C\,MAX}$ wherein $B_{CAP\,SAT}$ is $B_{CAP}$ at saturation point and $V_{C\,MAX}$ is a capacitor voltage at $B_{CAP\,SAT}$.

13. A method as defined in claim 12, further including the step of selecting turns ratio (n) of the output coil to the capacitor coils to set an open circuit, output voltage $V_{O\,OC}$ to a predetermined value: where $$V_{OOC} = n\frac{B_{CAPSAT}}{B_{CAP}} V_C$$

wherein $V_C$ is capacitor voltage.

* * * * *